US008063839B2

(12) United States Patent
Ansari et al.

(10) Patent No.: US 8,063,839 B2
(45) Date of Patent: Nov. 22, 2011

(54) TUNABLE ANTENNA SYSTEM

(75) Inventors: Saied Ansari, Oakland, CA (US); Behrooz Rezvani, San Ramon, CA (US)

(73) Assignee: Quantenna Communications, Inc., Fremont, CA (US)

( * ) Notice: Subject to any disclaimer, the term of this patent is extended or adjusted under 35 U.S.C. 154(b) by 832 days.

(21) Appl. No.: 11/872,700

(22) Filed: Oct. 15, 2007

(65) Prior Publication Data

US 2008/0088517 A1 Apr. 17, 2008

Related U.S. Application Data

(60) Provisional application No. 60/852,911, filed on Oct. 17, 2006.

(51) Int. Cl.
*H01Q 1/38* (2006.01)
*H04B 1/18* (2006.01)

(52) U.S. Cl. ...... 343/745; 343/861; 343/895; 455/193.3

(58) Field of Classification Search ........... 343/700 MS, 343/745, 750, 828, 852, 861, 868, 895, 703; 455/193.1, 193.3, 269, 280, 281
See application file for complete search history.

(56) References Cited

U.S. PATENT DOCUMENTS 5,268,695 A 12/1993 Dentinger et al.
5,729,558 A 3/1998 Mobin
6,035,007 A 3/2000 Khayrallah et al.
6,081,700 A * 6/2000 Salvi et al. ................. 455/193.3
6,351,499 B1 2/2002 Paulraj et al.
6,470,047 B1 10/2002 Kleinerman et al.
6,477,208 B1 11/2002 Huff
6,477,213 B1 11/2002 Miyoshi et al.
6,484,285 B1 11/2002 Dent
6,642,904 B2 * 11/2003 Yokoshima et al. .......... 343/829
6,807,404 B2 10/2004 Meijer
6,967,598 B2 11/2005 Mills
7,035,343 B2 4/2006 Chi et al.
7,058,422 B2 6/2006 Learned et al.
7,076,263 B2 7/2006 Medvedev et al.
7,194,237 B2 3/2007 Sugar et al.
7,224,743 B2 5/2007 Holmes et al.
7,298,798 B1 11/2007 Chao et al.
7,321,636 B2 1/2008 Harel et al.
7,400,872 B2 7/2008 Kogure
7,450,657 B2 11/2008 Paulraj et al.
7,564,931 B2 7/2009 Venkataramani et al.

(Continued)

FOREIGN PATENT DOCUMENTS

WO WO-2007021159 2/2007

(Continued)

OTHER PUBLICATIONS

Co-pending U.S. Appl. No. 11/653,135, filed Jan. 11, 2007.

(Continued)

*Primary Examiner* — Michael Wimer
(74) *Attorney, Agent, or Firm* — Sheppard Mullin Richter & Hampton LLP

(57) ABSTRACT

A technique for tuning an antenna may include one or more of the following: working against a ground plane, utilizing the third dimension by alternating layers on a substrate, integrating an inductive short stub in the substrate to improve port matching, and making a tuning port available for capacitive loading and resonance modification.

18 Claims, 11 Drawing Sheets

U.S. PATENT DOCUMENTS

| | | | |
|---|---|---|---|
| 7,623,836 | B1 | 11/2009 | Finkelstein |
| 2002/0163879 | A1 | 11/2002 | Li et al. |
| 2003/0003863 | A1 | 1/2003 | Thielecke et al. |
| 2003/0081701 | A1 | 5/2003 | Pick et al. |
| 2003/0087673 | A1 | 5/2003 | Walton et al. |
| 2003/0141938 | A1 | 7/2003 | Poklemba et al. |
| 2003/0157954 | A1 | 8/2003 | Medvedev et al. |
| 2003/0185309 | A1 | 10/2003 | Pautler et al. |
| 2004/0013209 | A1 | 1/2004 | Zehavi et al. |
| 2004/0234012 | A1 | 11/2004 | Rooyen |
| 2004/0240486 | A1 | 12/2004 | Venkatesh et al. |
| 2005/0053172 | A1 | 3/2005 | Heikkila |
| 2005/0085269 | A1 | 4/2005 | Buljore et al. |
| 2005/0099937 | A1 | 5/2005 | Oh et al. |
| 2005/0113041 | A1 | 5/2005 | Polley et al. |
| 2005/0130694 | A1 | 6/2005 | Medvedev et al. |
| 2005/0170839 | A1 | 8/2005 | Rinne et al. |
| 2005/0192019 | A1 | 9/2005 | Kim et al. |
| 2005/0195784 | A1 | 9/2005 | Freedman et al. |
| 2005/0220057 | A1 | 10/2005 | Monsen |
| 2005/0245201 | A1 | 11/2005 | Ella et al. |
| 2005/0265470 | A1 | 12/2005 | Kishigami et al. |
| 2005/0276361 | A1 | 12/2005 | Kim et al. |
| 2006/0034217 | A1 | 2/2006 | Kwon et al. |
| 2006/0034221 | A1 | 2/2006 | Karaoguz et al. |
| 2006/0083290 | A1 | 4/2006 | Shin et al. |
| 2006/0223487 | A1 | 10/2006 | Alam et al. |
| 2006/0270427 | A1 | 11/2006 | Shida et al. |
| 2006/0276227 | A1 | 12/2006 | Dravida |
| 2007/0136446 | A1 | 6/2007 | Rezvani et al. |
| 2007/0153924 | A1 | 7/2007 | Ling et al. |
| 2007/0202818 | A1 | 8/2007 | Okamoto |
| 2007/0258534 | A1 | 11/2007 | Schmidt |
| 2008/0139123 | A1 | 6/2008 | Lee et al. |

FOREIGN PATENT DOCUMENTS

| | | |
|---|---|---|
| WO | WO-2007130578 | 11/2007 |

OTHER PUBLICATIONS

Final Office Action Mailed May 11, 2010 in Co-pending U.S. Appl. No. 11/653,135, filed Jan. 11, 2007.

Non-Final Office Action Mailed Dec. 31, 2009 in Co-pending U.S. Appl. No. 11/653,135, filed Jan. 11, 2007.

Non-Final Office Action Mailed Jun. 8, 2009 in Co-pending U.S. Appl. No. 11/653,135, filed Jan. 11, 2007.

Co-pending U.S. Appl. No. 11/800,378, filed May 4, 2007.

Co-pending U.S. Appl. No. 12/299,470, filed Mar. 19, 2009.

Co-pending U.S. Appl. No. 12/288,569, filed Oct. 20, 2008.

Co-pending U.S. Appl. No. 11/800,357, filed May 4, 2007.

Non-Final Office Action Mailed May 4, 2010 in Co-pending U.S. Appl. No. 11/800,357, filed May 4, 2007.

Giallorenzi et al., "Noncoherent Sequence Demodulation for Trellis Coded M-DPSK", Military Communications Conference, 1991, MILCOM '91, Conference Record, Military Communication in a Changing World, IEEE, vol. 3, Nov. 1991, pp. 1023-1027.

Kong et al., "Detection of Amplitude-Phase Modulated Signals Over Frequency Nonselective Rayleigh Fading Channels with Adaptive Symbol-Aided Channel Estimation", 1996, Vehicular Technology Conference, 1996, Mobile Technology for the Human Race, IEEE 46th, vol. 2, pp. 983-987.

Written Opinion of PCT/US07/10845 dated Jul. 28, 2008, pp. 1-7.

International Search Report of PCT/US2008/011965 dated Mar. 25, 2009, pp. 1-3.

Written Opinion of PCT/US2008/0119655 dated Mar. 25, 2009, pp. 1-6.

International Search Report, PCT/US07/10845 (Jul. 28, 2008).

Rafati et al., IEEE Custom Integrated Circuit Conference, P-41-1:357-361 (2005).

Rafati et al., IEEE Journal of Solid State Circuits, 42(6):1291-1299 (2007).

Office Action mailed May 4, 2011 from U.S. Appl. No. 11/653,135 filed Jan. 11, 2007.

Office Action mailed Dec. 7, 2010 from U.S. Appl. No. 11/800,378 filed May 4, 2007.

Notice of Allowance mailed Mar. 17, 2011 from U.S. Appl. No. 11/800,378 filed May 4, 2007.

Office Action mailed Jan. 26, 2011 from U.S. Appl. No. 12/299,470 filed Mar. 19, 2009.

Office Action mailed Dec. 22, 2010 from U.S. Appl. No. 11/800,357 filed May 4, 2007.

Notice of Allowance dated May 12, 2011 from U.S. Appl. No. 11/800,357 filed May 4,. 2007.

* cited by examiner

800

TUNABLE ANTENNA SYSTEM

CROSS-REFERENCE TO RELATED APPLICATIONS

The present application claims priority to U.S. Provisional Patent App. No. 60/852,911, filed on Oct. 17, 2006, and which is incorporated herein by reference.

BACKGROUND

A common method of lowering resonant frequency of an antenna is to capacitively load an end of the structure. This method works for different types of antennas, for example a patch antenna or a monopole (e.g., dipole, folded antenna, or spiral).

Antenna bandwidth and quality (Q) factor are related to antenna volume. Generally, a higher antenna volume will result in higher bandwidth. The antenna Q factor, which is inversely related to the bandwidth, increases as the antenna volume is reduced. Therefore, if one is forced to reduce the size of an antenna due to size constraints, the bandwidth of the antenna is reduced as well. In cases where the required operating frequency range exceeds the antenna bandwidth, the antenna may be unable to overcome the narrow bandwidth.

The foregoing examples of the related art and limitations related therewith are intended to be illustrative and not exclusive. Other limitations of the related art will become apparent to those of skill in the art upon a reading of the specification and a study of the drawings.

BRIEF DESCRIPTION OF THE DRAWINGS

Examples of the claimed subject matter are illustrated in the figures.

DETAILED DESCRIPTION

In the following description, several specific details are presented to provide a thorough understanding of examples of the claimed subject matter. One skilled in the relevant art will recognize, however, that one or more of the specific details can be eliminated or combined with other components, etc. In other instances, well-known implementations or operations are not shown or described in detail to avoid obscuring aspects of the claimed subject matter.

Figure 1:
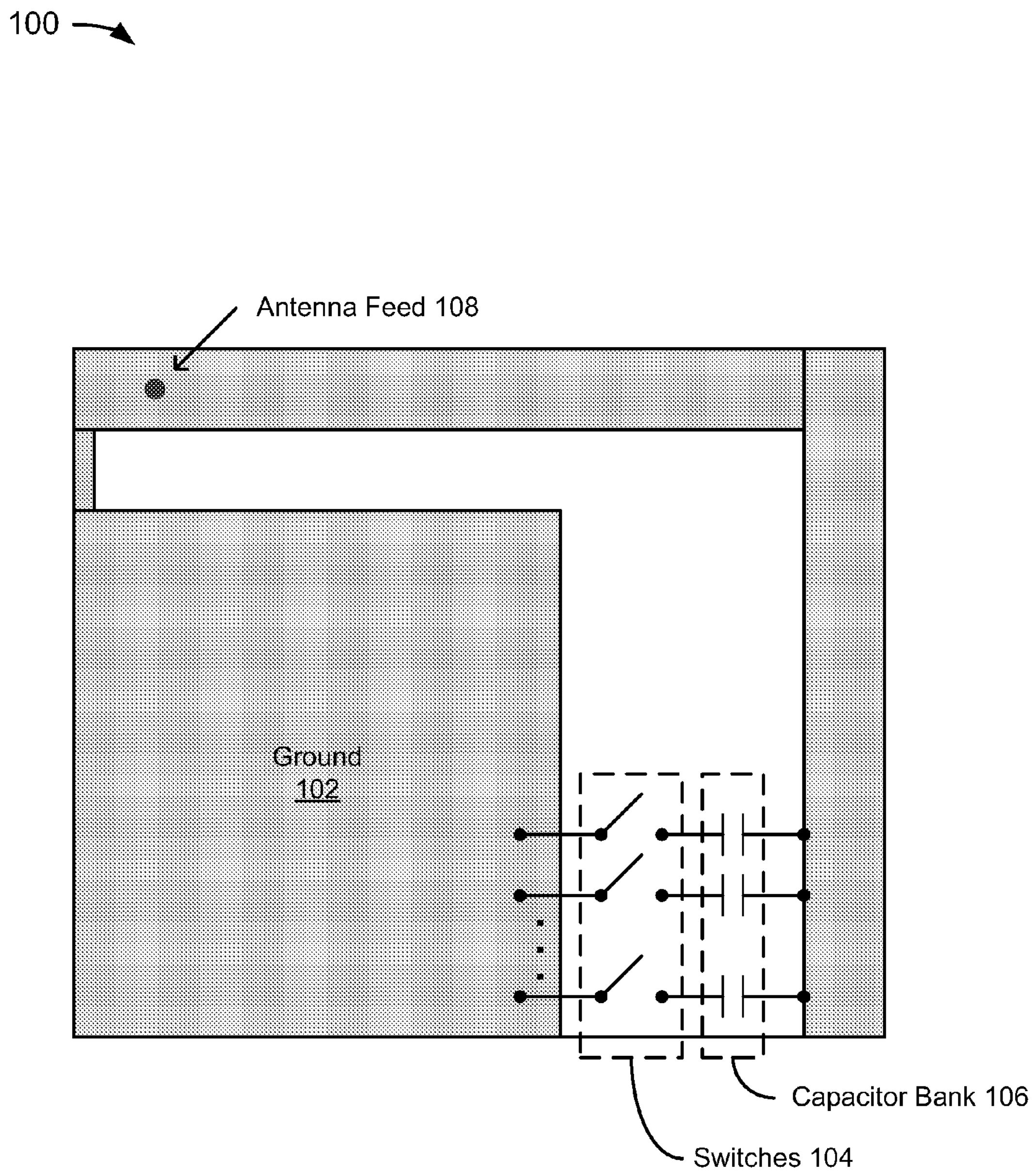
FIG. 1 depicts an example of a tunable antenna system with variable capacitive loading.

FIG. 1 depicts an example of a tunable antenna system 100 with variable capacitive loading. The system 100 includes ground 102, switches 104, capacitor bank 106, an antenna feed 108. In operation, some of the switches 104 may be closed, electrically coupling ground 102 through the switches 104 to the capacitor bank 106, which is in turn electrically coupled to the antenna feed 108.

To tune antenna resonance of the system 100, the switches 104 may be opened or closed to vary the amount of capacitive loading. In the example of FIG. 1, the capacitor bank 106 includes multiple fixed capacitors that are switched on or off dynamically depending on the amount of desired capacitive loading.

Figure 2:
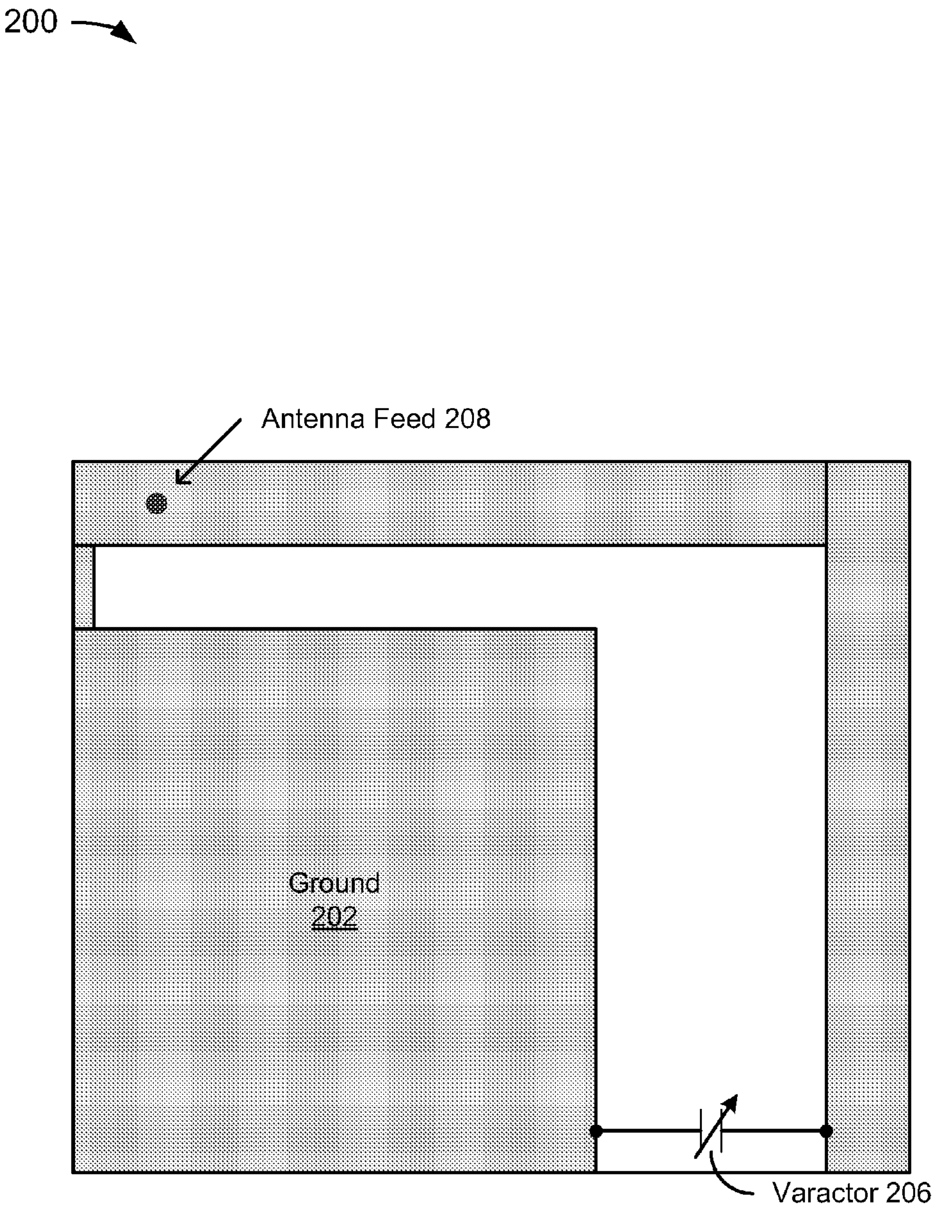
FIG. 2 depicts another example of a tunable antenna system with variable capacitive loading.

A more sophisticated technique to change capacitive loading is through a tuning voltage-variable capacitor (varactor) 206, as shown in FIG. 2. In this method the capacitive load value can be changed dynamically by changing a voltage input to the capacitor.

Figure 3:
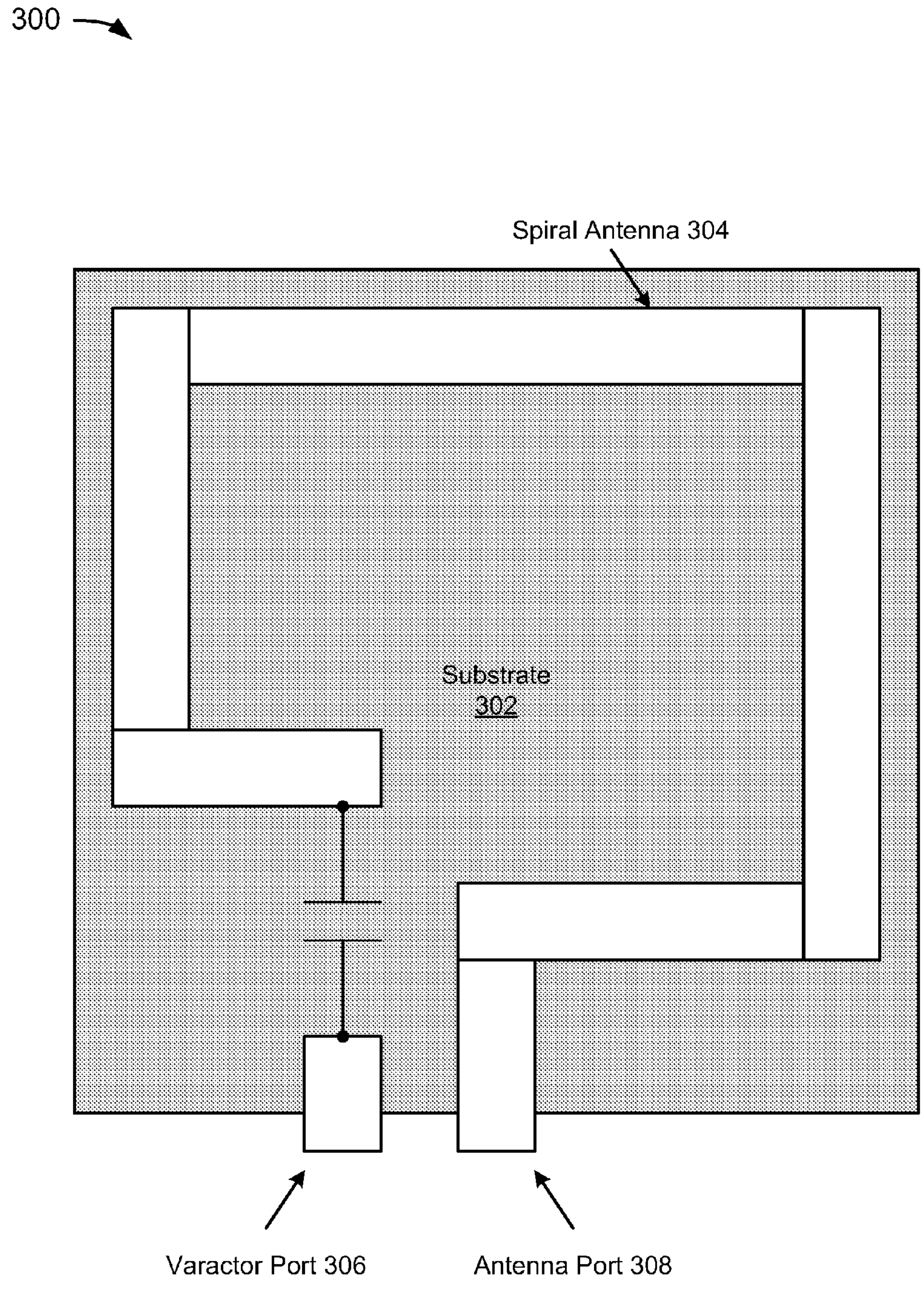
FIG. 3 depicts an example of a tunable antenna system with a folded antenna extended to multiple folds.

FIG. 3 depicts an example of a tunable antenna system 300 with a folded antenna extended to multiple folds. The system 300 includes a substrate 302, a spiral antenna 304, a varactor port 306, and an antenna port 308. The substrate 302 is optional, but is typical in antenna implementations. The spiral antenna 304 is an example of a folded antenna that is extended to multiple folds for, for example, size reduction. Capacitive loading of the spiral antenna may or may not be achieved in a similar method as a folded monopole.

Figure 4:
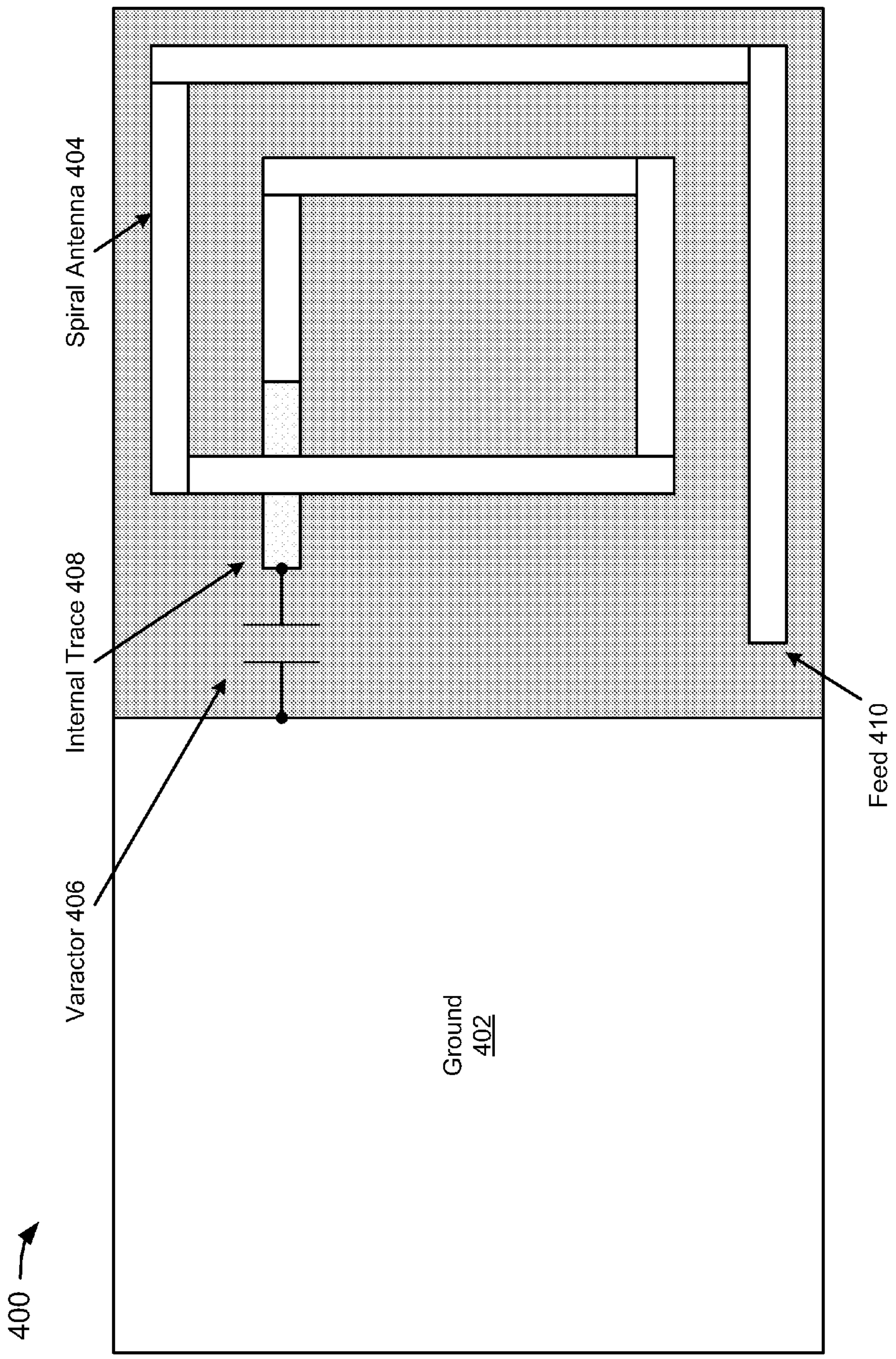
FIG. 4 depicts an example of a tunable antenna system with an alternate layer that electrically couples a varactor to ground.

FIG. 4 depicts an example of a tunable antenna system 400 with an alternate layer that electrically couples a varactor to ground. The system 400 includes ground 402, a spiral antenna 404, a varactor 406, an internal trace 408, and an antenna feed 410. Ground 402 is coupled to the spiral antenna 404 at the varactor 406. By adjusting voltage to the varactor 406, the spiral antenna 404 can be tuned. The internal trace 408 electrically coupling the varactor 406 to the spiral antenna 404 is on an alternate layer, as is illustrated in FIG. 4 by the internal trace 408 passing underneath a portion of the spiral antenna 404. For illustrative purposes, the feed 410 is coupled to the end of the spiral antenna 404 opposite the varactor 406.

Figure 5:
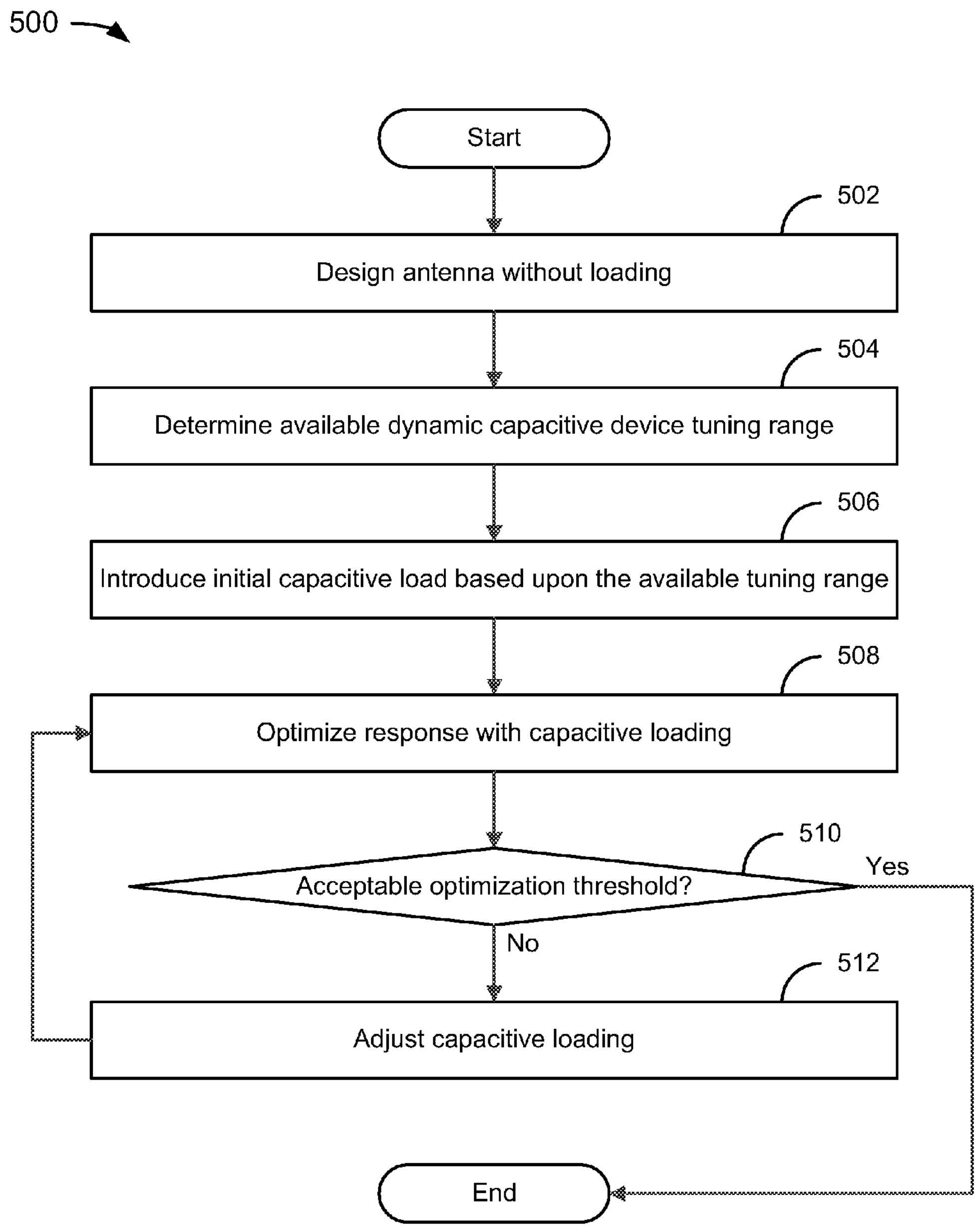
FIG. 5 depicts a flowchart of an example of a method for designing a tunable antenna.

FIG. 5 depicts a flowchart 500 of an example of a method for designing a tunable antenna. The flowchart is depicted as modules organized in a particular manner. However, it should be noted that the modules might be reorganized into a different order, or for parallel operation.

In the example of FIG. 5, the flowchart 500 starts at module 502 with designing a physical structure of an antenna without loading or tuning capacitance. A goal is to design an antenna that has a frequency response that is centered with respect to an operating frequency band. For instance, if the operating band is the 2400 to 2483 MHz WLAN range, it may be advantageous to design the antenna with its center frequency positioned at the center of the WLAN band, or 2441.5. It is also typically desirable to minimize return loss.

In the example of FIG. 5, the flowchart 500 continues to module 504 with determining an available dynamic capacitive device tuning range. The dynamic capacitive device may be, by way of example but not limitation, a varactor or bank of switchable capacitors. By way of example but not limitation, a varactor might have a tuning range of 1 to 9 pF, or any other known or convenient tuning range.

In the example of FIG. 5, the flowchart 500 continues to module 506 with introducing an initial capacitive load based on the tuning range. The initial amount of capacitive loading is dependent on the achievable capacitive tuning range provided by the dynamic capacitive device. For instance, if a varactor is capable of providing a 1 to 9 pF tuning range, it may be desirable to start with an initial loading of 5 pF.

In the example of FIG. 5, the flowchart 500 continues to module 508 with re-optimizing antenna dimensions for the desired center frequency, bandwidth, and return loss. At this point, variations in capacitive loading are likely to result in variations in center frequency of the antenna response with respect to the operating band.

In the example of FIG. 5, the flowchart 500 continues to decision point 510 where it is determined whether an acceptable optimization threshold has been reached. The threshold may be arbitrary, or dependent upon specific implementation- or embodiment-related variables. For example, in certain implementations, better optimization may be more important than in others.

While the acceptable optimization threshold has not been reached (510-N), the flowchart 500 continues to module 512 with adjusting the amount of loading to increase coverage of the frequency band during the tuning process, then returns to module 508 and continues from there as described previously. Ideally, but not necessarily, increased coverage achieved by adjusting the capacitive load will result in coverage of the entire frequency band. When the acceptable optimization threshold has been reached (510-Y), the flowchart 500 ends, having obtained the desirable optimization.

As previously mentioned, there is a direct correlation between antenna bandwidth and antenna volume. Therefore, instead of being limited to a planar structure, one can utilize the z-axis to expand the volume of an antenna, without affecting the xy area. By way of example but not limitation, a spiral antenna can be expanded in volume by alternating the traces between several layers of a substrate material.

Figure 6:
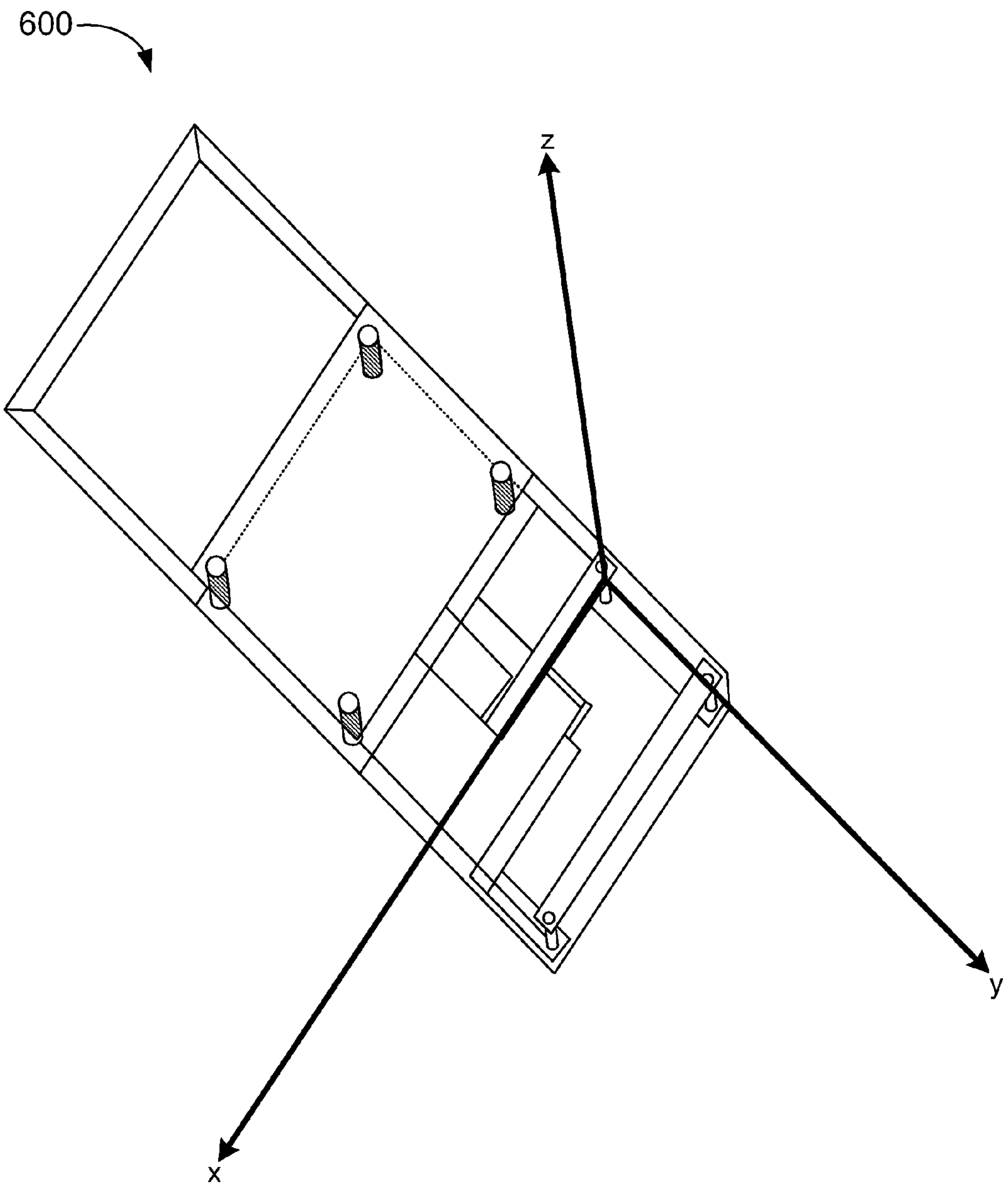
FIG. 6 depicts an example of a 3-D spiral antenna.
Figure 7:
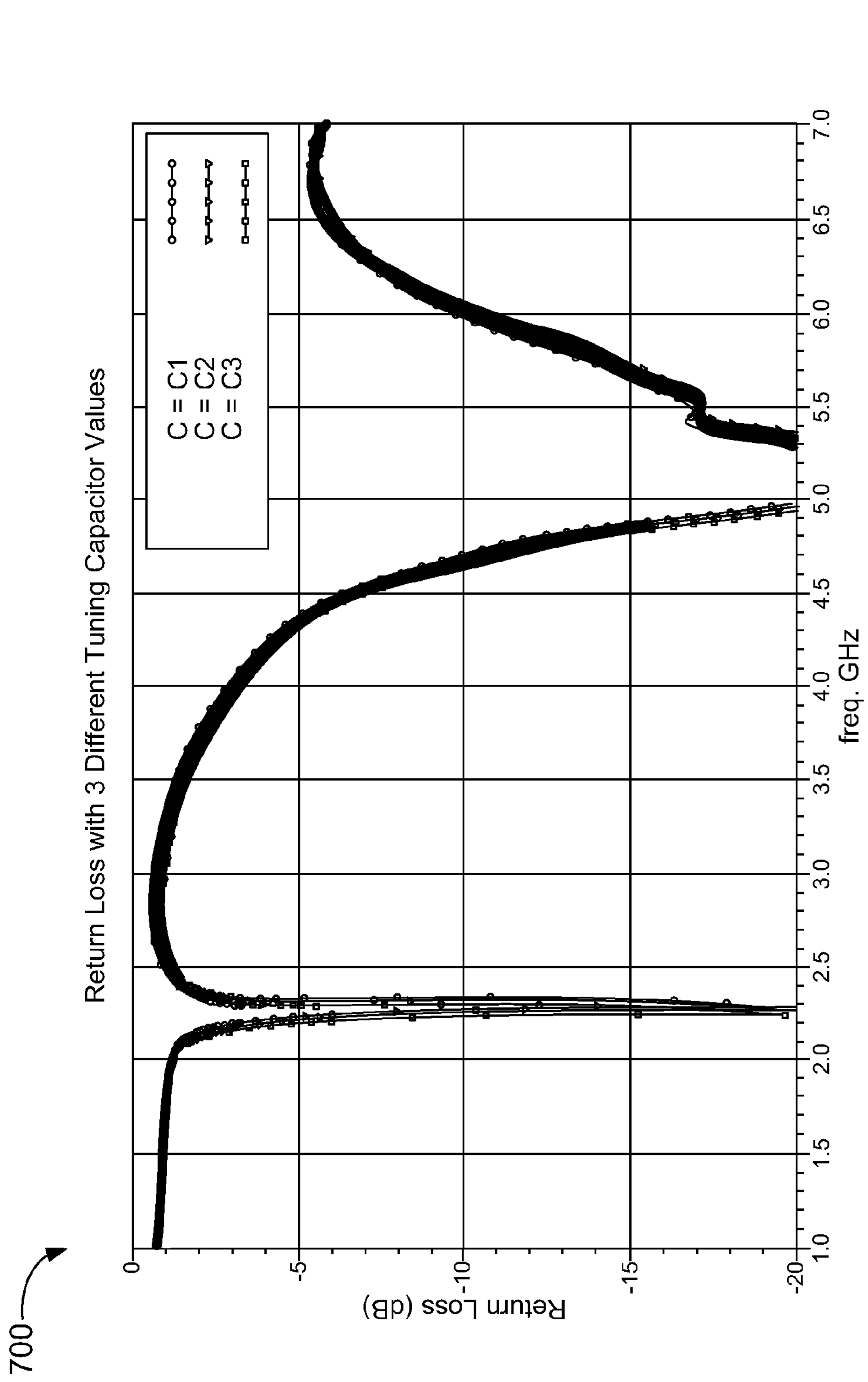
FIGS. 7 and 8 depict response of the antenna port of FIG. 6 while applying 3 different capacitor values to the tuning port.
Figure 8:
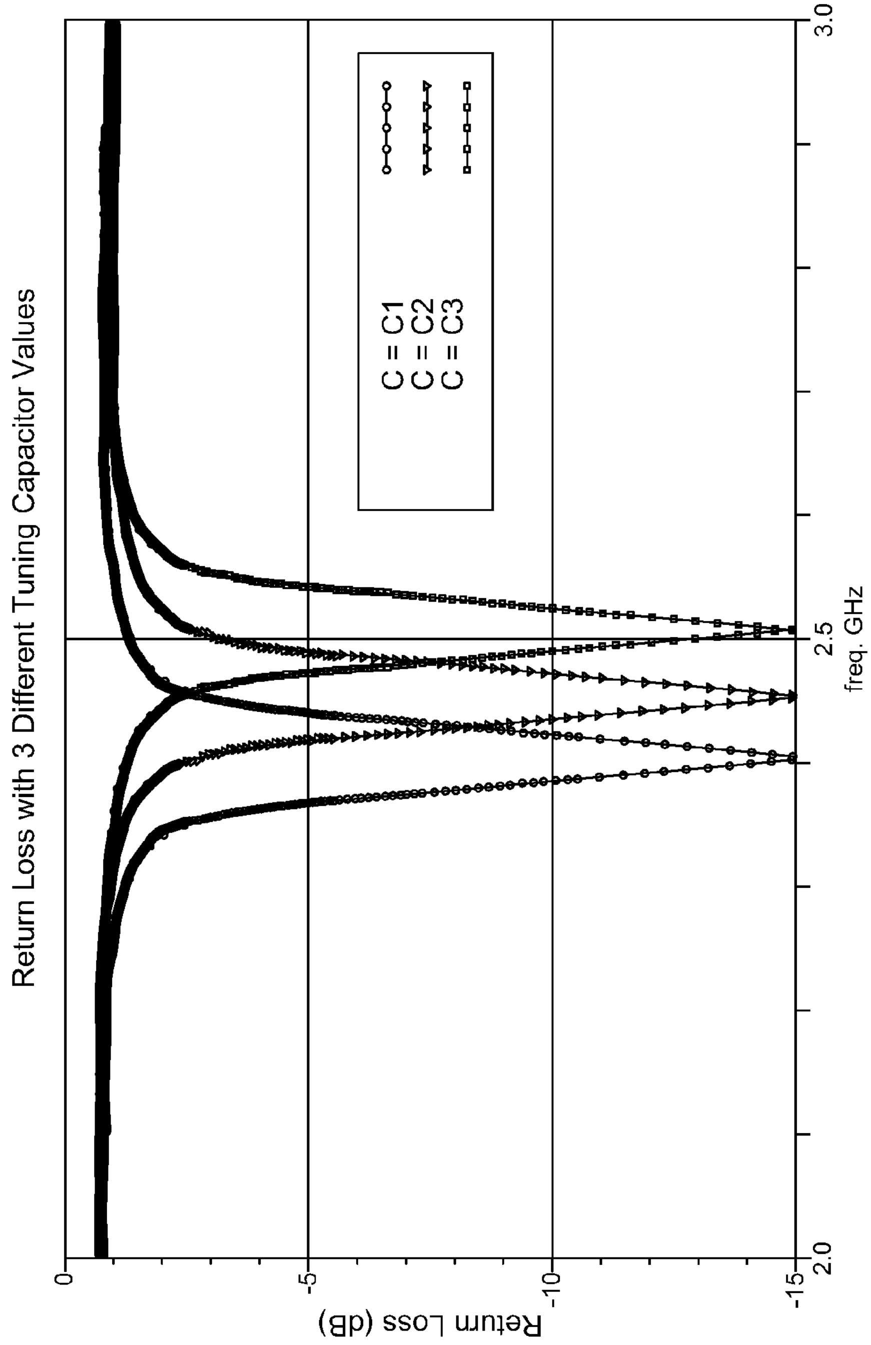

FIG. 6 shows a 3-D spiral antenna 600. FIGS. 7 and 8 depict response of the antenna port of FIG. 6 while applying 3 different capacitor values to the tuning port. For example, FIG. 7 depicts port response for different capacitive loading on a dual-band tunable antenna. FIG. 8 depicts a magnified portion of lower band frequency response with 3 different values for the tuning capacitor.

Tuning an antenna can be based on any desired performance metric. Received signal strength, or RSSI, is a desirable metric on which to base the tuning since it is a good indicator of antenna matching to the desired signal frequency. Other useful performance metrics include Signal to Noise Ratio (SNR) and packet error rate (PER), or combinations of RSSI, SNR, and/or PER. However, any applicable known or convenient performance metric may be used in various embodiments and/or implementations.

Figure 9:
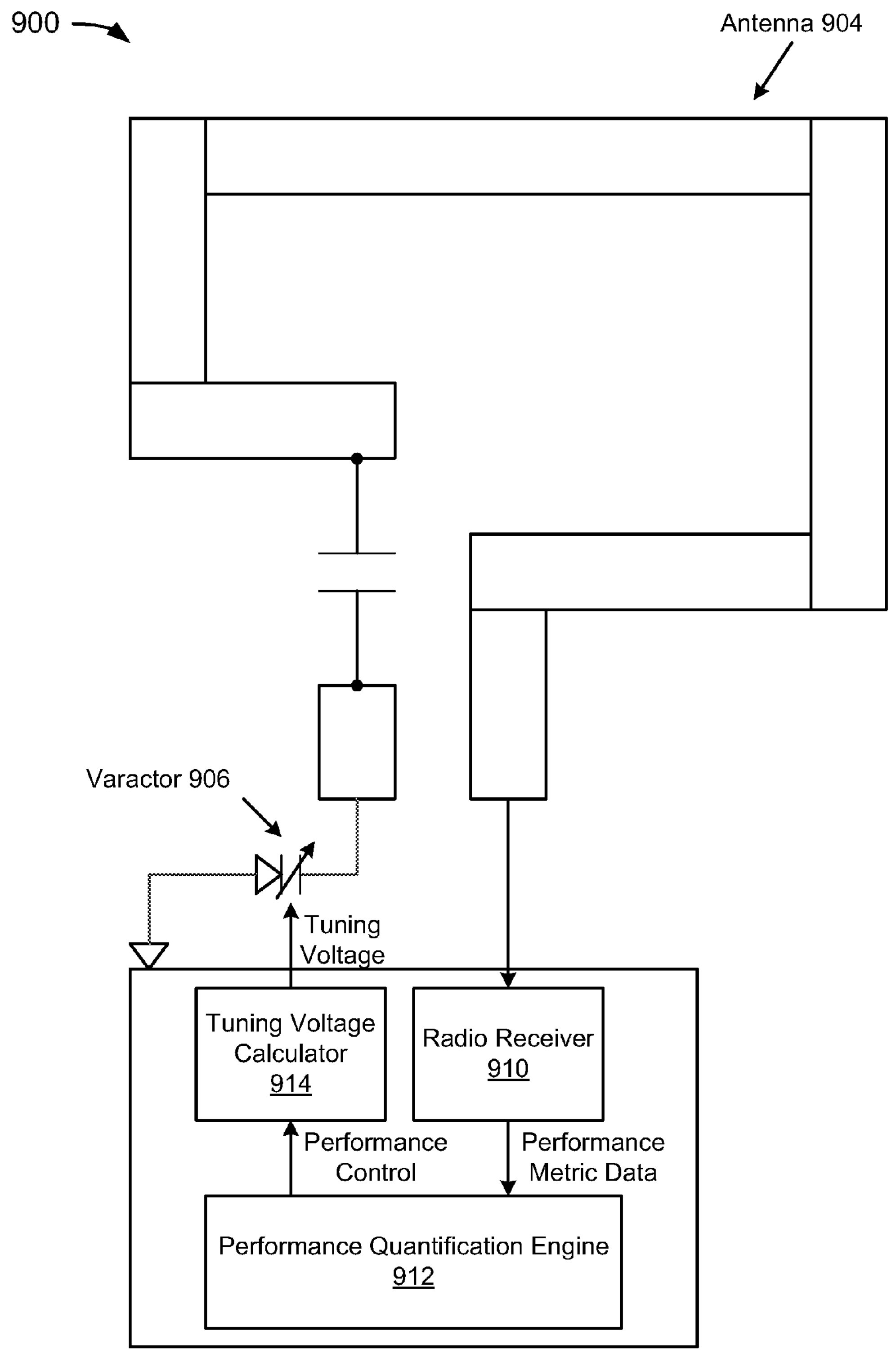
FIG. 9 depicts an example of a tunable antenna system with a radio receiver that provides performance metric data associated with a received signal to a tuning voltage calculator.

FIG. 9 depicts an example of a tunable antenna system 900 with a radio receiver that provides performance metric data associated with a received signal to a tuning voltage calculator. The system 900 includes an antenna 904, a varactor 906, a radio receiver 910, a performance quantification engine 912, and a tuning voltage calculator 914. For illustrative purposes only, the antenna 904 is depicted as a spiral antenna like the spiral antenna 304 (FIG. 3).

In the example of FIG. 9, the radio receiver 910 is coupled by an antenna feed to the antenna 904 and, in operation, receives signals from the antenna 904. Performance metric data associated with the signals are provided to the performance quantification engine 912. Performance metric data may include practically any data associated with the signal, such as signal strength. The performance quantification engine 912 may use the performance metric data directly, or in conjunction with historic signal data, to estimate a desirable performance control signal. In some embodiments, the radio receiver 910 may include the performance quantification engine 912, but this is not critical to an understanding of the techniques described herein. The performance control signal from the performance quantification engine 912 instructs the tuning voltage calculator 914 to either make no change to a tuning voltage currently coupled to the varactor 906, or to increase or decrease the current tuning voltage. In this way, signals received from the tuned antenna 904 will, under normal operating conditions that properly implement this technique, have improved performance as measured by the performance metric.

Performance metric data is associated with a received signal, such as RSSI, SNR, PER, or some other performance metric. The performance metric data could provide a performance metric without any processing (e.g., the signal strength could be used directly to estimate performance). A performance metric could use data from multiple signals concurrently, or make use of historic signal data, to estimate RSSI, SNR, PER, or other performance metric.

The performance quantification engine 912 could repeatedly or periodically perform single-stage tuning, or perform stage one tuning one or more times then use a different performance metric to accomplish stage two tuning. Repetition of either first, second, or other stage tuning could be desirable to adjust to temperature changes or other changes associated with circuit aging, as this aging can change the performance and specifications of circuit active (e.g. transitors) and passive (e.g. resistors, capacitors, and inductors) components. As one of many examples, the first stage tuning could be occasionally repeated to take into account possible changes to the antenna caused by temperature variations, moisture, circuit changes (e.g., bias current could change). In this example, the second stage tuning may be repeated more frequently and more quickly.

As another example the first stage tuning may have lower complexity than the second stage tuning. So, the first stage tuning is fast, and the second stage tuning takes longer to complete. The amount of second stage tuning might be set dynamically (e.g., when the system decides it has resources to spare to do a more thorough tuning) or preset.

As another example, a reason to repeat one or both stages is that a system may dynamically change its frequency of operation and/or its signal bandwidth, which would benefit from retuning the antenna.

A reason to have two stages could be that the first stage must be done quickly to ensure reasonable operation, so would be based on a fast computation, and then fine tuning in a second stage could be done more slowly. Another reason to have two stages is complexity. One of the stages could be based on a simple algorithm that could be updated fairly often. A more complex algorithm could be done in the other stage, which would be performed less often to save power. A third reason to have more than one stage is that the performance metric associated with the first stage could be instantaneous, while the performance metric associated with the second stage could be based on instantaneous as well as past measurements, and hence would need more time to do the calculation.

The performance quantification engine 912 could generate a performance control signal using multiple performance metrics in parallel. Alternatively, the performance quantification engine 912 could generate a performance control signal using one or more performance metrics, and fine tune the performance control signal using the same or different performance metrics. In other words, multiple performance metrics could be applied in parallel or serially.

Figure 10:
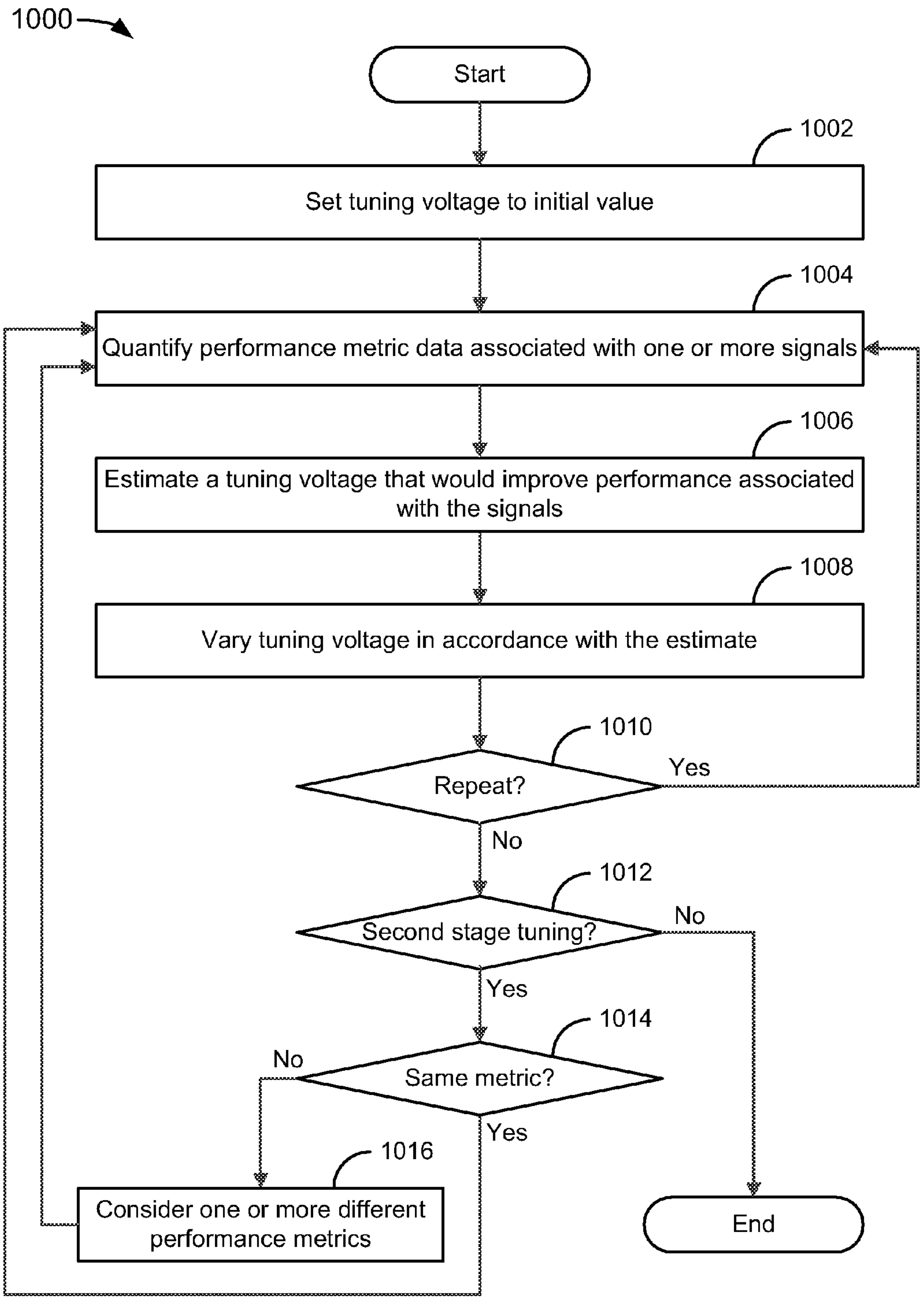
FIG. 10 depicts a flowchart of an example of a method for tuning voltage calculation using a performance metric.

FIG. 10 depicts a flowchart 1000 of an example of a method for a tuning voltage calculation using a performance metric.

FIG. 10 depicts modules organized in a particular order. However, the modules may be rearranged to change their order or for parallel execution.

In the example of FIG. 10, the flowchart 1000 starts at module 1002 with setting tuning voltage to an initial value. The initial value may be, for example, a starting nominal value, a value that sets a dynamic capacitive device at a level halfway between the minimum and maximum values, an initial "best guess" regarding performance, or some other appropriate, random, or arbitrary starting value. Moreover, the setting could be implicit, for systems that have a value at startup.

In the example of FIG. 10, the flowchart 1000 continues to module 1004 where performance metric data associated with one or more signals is quantified. The signals may be received on an antenna, such as the antennae described with reference to FIGS. 1-9. Performance metric data may be included in the signals themselves, or derived from the signals individually or relative to one another or relative to historic signal data. Quantification may yield a value such as an RSSI, a SNR, or a PER.

In the example of FIG. 10, the flowchart 1000 continues to module 1006 where a tuning voltage that would improve performance associated with the signals is estimated. For example, if the applicable performance metric is RSSI, the tuning voltage estimate will be for a voltage that is estimated to improve RSSI for future signals. Of course, the RSSI used is for signals that were already received, so the improved performance is associated with the received signals with the assumption that future signals will be sufficiently similar such that an improvement in performance for past signals will result in an improvement in performance for future signals; this is typically a safe assumption.

If multiple performance metrics are considered simultaneously, it may be that the estimate is different for one or more of the applicable performance metrics. In such a case, the performance metrics may be weighted and a weighted average performance improvement may be estimated. Any appropriate algorithm could be implemented to achieve desired weighting, or lack thereof, for various performance metrics, and depending upon the embodiment or implementation. The algorithm could also use different weighting dynamically in response to an environment or configurable conditions.

In the example of FIG. 10, the flowchart 1000 continues to module 1008 where tuning voltage is varied in accordance with the estimate. For example, if it is estimated that SNR will be higher if voltage is increased to a tuning capacitor device, then the tuning voltage will be increased in accordance with the estimate.

In the example of FIG. 10, the flowchart 1000 continues to decision point 1010, where it is determined whether to repeat the quantification of performance metric data. This may be desirable to occasionally or periodically adjust the tuning of the antenna. If it is determined that the quantification is to be repeated (1010—Yes), the flowchart 1000 returns to module 1004 and continues as described previously. If, on the other hand, it is determined that the quantification need not be repeated (1010—No), the flowchart 1000 continues to decision point 1012 where it is determined whether second stage tuning is desired.

It may be noted that when a system includes second stage tuning, continuing to module 1004 may be in accordance with a first stage or a second stage. If neither first stage tuning (1010—No) nor second stage tuning (1012—No) is desired, the flowchart 1000 ends, having performed the tuning function for the requisite duration, number of times, et al.

If it is determined that second stage tuning is desired (1012—Yes) in lieu of repeating first stage tuning, the flowchart 1000 continues to decision point 1014 where it is determined whether to use the same metric as before. If it is determined that the same metric is to be used (1014—Yes), the flowchart 1000 returns to module 1004 and continues as described previously. It may be noted that first stage tuning (1010—Yes) and second stage tuning with the same metric (1014—Yes) may or may not be identical. For example, the tuning voltage may be set according to the estimate for each repetition, while the tuning voltage may be adjusted more gradually according to the estimate for a fine tuning using the same performance metric or metrics.

If it is determined that the same metric is not to be used (1014—No), then the flowchart 1000 continues to module 1016 where a different performance metric or set of performance metrics are considered, then the flowchart 1000 continues to module 1004 as described previously. The different performance metric(s) may be an entirely different set of performance metrics from those considered in previous iterations of the flowchart 1000, or the sets could be overlapping. Typically, though not necessarily, second stage tuning may be desirable in this case to avoid fluctuations due to differing estimates based upon differing performance metrics; not all performance metrics will necessarily yield the same estimates under identical conditions.

Note that the input impedance of an antenna is also affected when the size is reduced by multiple folds and alternating layers. The detuning of antenna impedance is compensated for by using reactive matching elements. For instance, as in the case of the folded antenna with a capacitive loading built into a PC board structure, if the spiral antenna's input impedance is capacitive at the desired resonant frequency, a shunt inductive stub will retune the input to the desired resistive value. Advantageously, use of a shunt inductive stub in the context of the techniques described herein can reduce mismatch, which would increase SNR and efficiency. This can in turn impact the performance metrics used as described previously.

Figure 11:
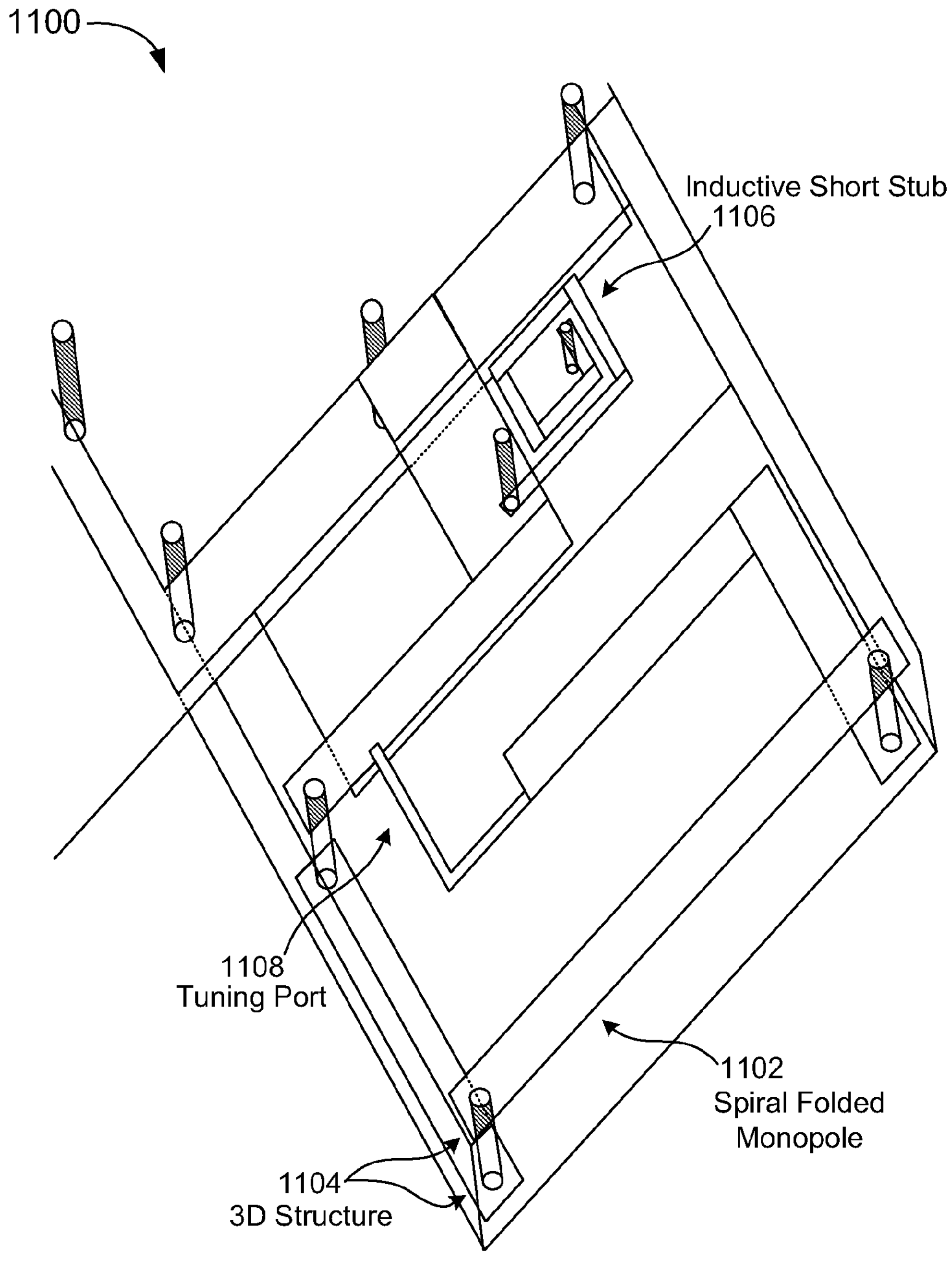
FIG. 11 depicts an example of a tunable antenna system.

FIG. 11 depicts an example of a tunable antenna device 1100. The tunable antenna device 1100 includes a spiral folded monopole 1102 implemented with a three-dimensional structure 1104, an inductive short stub 1106, and a tuning port 1108.

In the example of FIG. 11, the spiral folded monopole 1102 works against a ground plane. Notably the spiral folded structure enables one to create a small antenna. Unfortunately, although the structure may have good bandwidth characteristics, it is relatively difficult to tune compared to larger antennae.

In the example of FIG. 11, the three-dimensional structure utilizes the third dimension by alternating layers on a substrate. This provides improved bandwidth characteristics for a relatively small antenna. However, as was indicated with respect to the spiral folded monopole 1102 above, it is not as easy to tune a small antenna as a large one.

In the example of FIG. 11, the inductive short stub 1104 is integrated in the substrate to improve port matching (impedance mismatch). This can somewhat ameliorate the problems introduced by decreasing the size of the antenna using the tuning techniques described herein.

In the example of FIG. 11, the tuning port 1106 is available for capacitive loading and resonance modification. The tuning facilitates keeping a frequency band centered, which is of increasing importance as the size of the antenna decreases.

This type of tuning may have little to no practical impact on large antennas. However, for frequency ranges in, for example, the Wi-Fi band, with a small antenna, performance can be improved.

Advantageously, using the techniques described herein, an antenna can be made that has a compact size, tunability, and integrated matching. This may facilitate antenna integration with an IC package.

Systems described herein may be implemented on any of many possible hardware, firmware, and software systems. Typically, systems such as those described herein are implemented in hardware on a silicon chip. Algorithms described herein are implemented in hardware, such as by way of example but not limitation RTL code. However, other implementations may be possible. The specific implementation is not critical to an understanding of the techniques described herein and the claimed subject matter.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A tunable antenna system comprising:

an antenna structure, including an internal trace coupled to a first arm of a plurality of antenna arms, wherein the internal trace passes under a second arm of the plurality of antenna arms;

a dynamic capacitive loading device, having an achievable dynamic capacitive device tuning range, coupled to the internal trace of the antenna structure, wherein the dynamic capacitive loading device has a variable capacitive load that depends upon voltage from a voltage source provided on a voltage input of the dynamic capacitive loading device;

a performance quantification engine coupled to the dynamic capacitive loading device, wherein, in operation, the performance quantification engine performs first stage tuning one or more times using a first performance metric of a plurality of performance metrics then uses a second performance metric of the plurality of performance metrics to accomplish second stage tuning, wherein the first stage tuning has lower complexity than the second stage tuning;

wherein, in operation, voltage provided by the voltage source is adjusted from a first setting that is within the achievable dynamic capacitive device tuning range through a set of second settings that are within the achievable dynamic capacitive device tuning range to a third setting that is within the achievable dynamic capacitive device tuning range in accordance with the first or second performance metric to tune the antenna.

2. The system of claim 1 wherein the antenna structure is embodied in an IC package.

3. The system of claim 1 wherein the antenna structure is selected from the group consisting of a patch antenna and a monopole antenna.

4. The system of claim 1 wherein the antenna structure includes a folded spiral structure.

5. They system of claim 1 wherein the antenna structure includes a three dimensional antenna structure with a first portion of the antenna structure on a first substrate layer and a second portion of the antenna structure on a second substrate layer.

6. The system of claim 1 further comprising:

an antenna feed coupled to the antenna structure;

an inductive stub coupled between the antenna feed and at least a portion of the antenna structure, wherein when an input impedance associated with the antenna structure is capacitive at a desired resonant frequency, the inductive stub matches the input to a desired resistive value.

7. The system of claim 1 further comprising a voltage source for providing variable voltage on the voltage input of the dynamic capacitive loading device.

8. They system of claim 1 wherein the dynamic capacitive loading device includes a varactor.

9. The system of claim 1 further comprising:

a substrate on which the antenna structure is formed;

an internal trace coupled to a first portion of the antenna structure on a first layer of the substrate, wherein a second portion of the antenna structure is on a second layer of the substrate.

10. The system of claim 1 further comprising a tuning voltage calculator for providing a tuning voltage to the dynamic capacitive loading device.

11. The system of claim 1, further comprising a radio receiver capable of extracting performance metric data from signals received from the antenna structure, wherein the performance metric data is used to determine a tuning voltage for the dynamic capacitive loading device that is estimated to improve performance according to a performance metric associated with the performance metric data.

12. The system of claim 1, further comprising a performance quantification engine to derive a performance control signal from historic data and performance metric data derived from signals received from the antenna structure, wherein a tuning voltage is provided to the dynamic capacitive loading device in accordance with the performance control signal.

13. A method comprising:

performing a first tuning stage, including:

setting a tuning voltage to an initial value, wherein tuning voltage impacts antenna performance;

quantifying performance metric data associated with one or more signals, wherein performance metric data is associated with the antenna performance and the one or more signals;

estimating, using the performance metric data, a tuning voltage that would improve the antenna performance;

varying tuning voltage in accordance with the estimated tuning voltage to improve the antenna performance;

performing a second tuning stage, including:

quantifying second performance metric data associated with one or more different performance metrics;

estimating, using the performance metric data, a second tuning voltage that would improve the antenna performance;

varying tuning voltage in accordance with the estimated second tuning voltage to improve the antenna performance.

14. The method of claim 13, further comprising repeating the first tuning stage prior to performing the second tuning stage.

15. The method of claim 13, wherein the first tuning stage is associated with a baseline tuning and the second tuning stage is associated with fine tuning.

16. A system comprising:

a radio receiver;

a performance quantification engine coupled to the radio receiver;

a tuning voltage calculator coupled to the performance quantification engine;

wherein, in operation:

the radio receiver receives a signal from an antenna; the radio receiver sends performance metric data from the signal to the performance quantification engine;

the performance quantification engine provides a performance control signal derived from the performance metric data to the tuning voltage calculator during a first stage tuning;

the tuning voltage calculator estimates a tuning voltage that, when provided to a dynamic capacitive loading device coupled to the antenna, would improve performance of the antenna during the first stage tuning;

the performance quantification engine provides a second performance control signal derived from the performance metric data to the tuning voltage calculator during a second stage tuning;

the tuning voltage calculator estimates a second tuning voltage that, when provided to the dynamic capacitive loading device coupled to the antenna, would improve performance of the antenna during the second stage tuning.

17. The system of claim 16, further comprising:

the antenna, coupled to the radio receiver;

the dynamic capacitive loading device electrically coupled to the tuning voltage calculator.

18. The system of claim 16, wherein the antenna includes an internal trace coupled to a first arm of a plurality of antenna arms, and wherein the internal trace passes under a second arm of the plurality of antenna arms.

* * * * *